Patented Jan. 13, 1942

2,269,581

UNITED STATES PATENT OFFICE 2,269,581

WELD METAL

Donald K. Crampton, Marion, and Henry L. Burghoff, Waterbury, Conn., assignors to Chase Brass & Copper Co. Incorporated, Waterbury, Conn., a corporation No Drawing. Application July 31, 1940, Serial No. 349,020

4 Claims. (Cl. 219—8)

This invention relates to improvements in weld metal for use in arc welding.

This application is a continuation-in-part of our application Serial No. 269,780, filed April 24, 1939.

One object of this invention is to provide an improved weld metal for use in arc welding.

Other objects of this invention will appear from the present disclosure.

We have invented a new weld metal particularly suitable for arc welding base metal of either tough-pitch copper or deoxidized copper. The welding process can be carried out by means of a carbon rod forming the arc and our improved alloy in rod or other form being melted by the heat of the arc to form the filler metal of the welded joint, or our improved weld metal can be in the form of a metal rod which is used both to form the arc and supply the welding or filler metal.

Our improved weld metal or welding alloy contains nickel from about $\frac{1}{2}\%$ to about 10%, phosphorus from about $\frac{1}{20}\%$ to about $\frac{1}{2}\%$, tin in any amount up to about 2% although preferably from about $\frac{1}{4}\%$ to about 2%, and the balance substantially of copper, although the tin can be omitted. Tin is preferably present, however, as it gives the alloy increased strength, increased fluidity, and increased wetting power. Expressions such as "the balance or remainder substantially of copper," etc., are intended to include such one or more additional elements in such substantially innocuous amounts as do not seriously impair the desired properties of the alloy, that is, in such amounts as do not essentially change the nature of the alloy.

A more preferred range is to have the nickel from about 1% to about 5%, the phosphorus from about 0.1% to about $\frac{1}{4}\%$, the tin from about $\frac{1}{2}\%$ to $1\frac{1}{2}\%$, and the balance substantially of copper. A still more preferred alloy is to have nickel about 2%, phosphorus about $\frac{1}{4}\%$, tin about 1%, and the balance substantially of copper.

Alloys made in accordance with the present invention have been found particularly well suited for use as welding-rods in carbon arc and metal arc welding of copper, low tin content bronze, and low zinc content brasses. In the arc welding of such base metals, considerable difficulty is frequently encountered due to gas inclusions and lack of "wetting" of the metal by the molten welding rod. Our improved alloys have unusual wetting power and thus make the actual welding operation much easier. This excellent wetting power is apparent in welding, not only tough-pitch copper and deoxidized copper, but also tin bronzes, cast iron, and steel.

Another effect, possibly connected indirectly with the wetting power just described, is that the "bead" of weld metal is noticeably lower and flatter than when ordinary low or high tin phosphorus bronzes are used as welding rods. This results in a definitely lower consumption of welding rods per inch of weld. Also a noticeably faster rate of welding results.

Another advantage of the new welding rods is that they can be used bare for metal arc welding. This is most unusual, as with other metal arc welding rods it is necessary to use a heavy non-metallic mineral coating to stabilize the arc, as otherwise the arc would be very wild, and excessive spattering and unsoundness and cold shuts would result. With our improved alloys used bare, a surprisingly steady arc can be held. If desired, however, our alloys can be used with a suitable coating and for certain uses their effectiveness possibly increased thereby. Such a coating could be, for example, a mixture of borax, boric acid, sodium carbonate, a chloride such as salt, and a binder such as waterglass or lacquer.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A welding rod for fusion-type welding, characterized by high fluidity and high wetting power in the molten state, and formed from an alloy consisting of: nickel from about $\frac{1}{2}\%$ to about 10%; phosphorus from about $\frac{1}{20}\%$ to about $\frac{1}{2}\%$; tin, if any, up to about 2%; and the balance substantially of copper.

2. A welding rod for fusion-type welding, characterized by high fluidity and high wetting power in the molten state, and formed from an alloy consisting of: nickel from about $\frac{1}{2}\%$ to about 10%; phosphorus from about $\frac{1}{20}\%$ to about $\frac{1}{2}\%$; tin from about $\frac{1}{4}\%$ to about 2%; and the balance substantially of copper.

3. A welding rod for fusion-type welding, characterized by high fluidity and high wetting power in the molten state, and formed from an alloy consisting of: nickel from about 1% to about 5%; phosphorus from about $\frac{1}{10}\%$ to about $\frac{1}{4}\%$; tin from about $\frac{1}{2}\%$ to about $1\frac{1}{2}\%$; and the balance substantially of copper.

4. A welding rod for fusion-type welding, characterized by high fluidity and high wetting power in the molten state, and formed from an alloy consisting of: nickel about 2%; phosphorus about $\frac{1}{4}\%$; tin about 1%; and the balance substantially of copper.

DONALD K. CRAMPTON.
HENRY L. BURGHOFF.